United States Patent
Schütz

(10) Patent No.: US 9,984,262 B2
(45) Date of Patent: May 29, 2018

(54) METHOD OF OPERATING AN RFID-ENABLED MOBILE TELEPHONE, MOBILE TELEPHONE, REMOTE UNIT AND APPLICATION PROGRAM PRODUCT

(71) Applicant: IDP INVENT AG, Olten (CH)

(72) Inventor: Matthias Schütz, Olten (CH)

(73) Assignee: IDP INVENT AG, Olten (CH)

( * ) Notice: Subject to any disclaimer, the term of this patent is extended or adjusted under 35 U.S.C. 154(b) by 38 days.

(21) Appl. No.: 14/888,870

(22) PCT Filed: Apr. 27, 2014

(86) PCT No.: PCT/IB2014/061031
§ 371 (c)(1),
(2) Date: Nov. 3, 2015

(87) PCT Pub. No.: WO2014/177984
PCT Pub. Date: Nov. 6, 2014

(65) Prior Publication Data
US 2016/0078261 A1   Mar. 17, 2016

(30) Foreign Application Priority Data
May 3, 2013 (EP) .................................. 13166565

(51) Int. Cl.
*H04W 64/00* (2009.01)
*G06F 15/16* (2006.01)
(Continued)

(52) U.S. Cl.
CPC ....... *G06K 7/10386* (2013.01); *G06F 1/1601* (2013.01); *H04M 1/7253* (2013.01);
(Continued)

(58) Field of Classification Search
CPC .... G06K 7/10386; G06K 19/08; G06K 7/087; G06K 7/089; G06K 7/10415;
(Continued)

(56) References Cited

U.S. PATENT DOCUMENTS 8,244,236 B2 * 8/2012 Roumeliotis ......... H04W 4/021
455/424
9,013,275 B2 * 4/2015 Zumsteg .................. H04Q 9/00
340/10.1
(Continued)

FOREIGN PATENT DOCUMENTS

WO   WO 2006/092220 A2   9/2006

OTHER PUBLICATIONS

International Search Report (PCT/ISA/210) dated Oct. 28, 2014, by the IB Patent Office as the International Searching Authority for International Application No. PCT/IB2014/061031.
(Continued)

*Primary Examiner* — Dionne H Pendleton
(74) *Attorney, Agent, or Firm* — Buchanan Ingersoll & Rooney PC

(57) ABSTRACT

A method is disclosed of operating a RFID-enabled mobile telephone for indicating information of at least one portable object (e.g. key, passport, glasses or medical box). The mobile telephone has an RFID communication unit and the method includes operating the RFID communication unit for receiving an RFID signal from an RFID tag that is attached to the at least one portable object; evaluating the received RFID signal for determining tag information; and presenting the tag information to the user of the mobile telephone for indicating current information of the at least one portable object. This way, up-to-date information of the portable objects is available precisely when needed.

17 Claims, 3 Drawing Sheets

(51) Int. Cl.
*G06K 7/10* (2006.01)
*G06F 1/16* (2006.01)
*H04W 4/02* (2018.01)
*H04M 1/725* (2006.01)
*H04W 4/00* (2018.01)

(52) U.S. Cl.
CPC ....... *H04M 1/72569* (2013.01); *H04W 4/008* (2013.01); *H04W 4/021* (2013.01); *H04W 64/00* (2013.01); *H04M 2250/04* (2013.01)

(58) Field of Classification Search
CPC ........... G06K 19/0723; G06K 7/10366; G06K 19/0717; G06K 9/00342; G06K 7/0008; G06K 19/06037; G06K 19/0712; G06K 19/0727; G06K 2017/0045; G06K 7/10198; G06K 7/10237; G06K 7/10376; G06K 7/10881; G06K 7/10891; G06K 7/10396; G06K 7/10475; G06K 2007/10524; G06K 9/00369; H04M 1/7253; H04M 1/72569; H04M 2250/04; H04W 4/008
See application file for complete search history.

(56) References Cited

U.S. PATENT DOCUMENTS

| | | | | |
|---|---|---|---|---|
| 9,055,162 B2* | 6/2015 | Park | ...................... | G06F 1/1601 |
| 9,119,166 B1* | 8/2015 | Sheikh | .................. | H04W 64/00 |
| 9,172,786 B2* | 10/2015 | Lee | ...................... | H04M 1/7253 |
| 2007/0099679 A1 | 5/2007 | Saarisalo | | |
| 2008/0174405 A1* | 7/2008 | Toorn | .................. | H04M 1/7253 340/10.1 |
| 2009/0121841 A1 | 5/2009 | Twitchell, Jr. | | |
| 2009/0124302 A1 | 5/2009 | Twitchell, Jr. | | |
| 2009/0124303 A1 | 5/2009 | Twitchell, Jr. | | |
| 2009/0124304 A1 | 5/2009 | Twitchell, Jr. | | |
| 2009/0135000 A1 | 5/2009 | Twitchell, Jr. | | |
| 2009/0161589 A1 | 6/2009 | Twitchell, Jr. | | |
| 2009/0161642 A1 | 6/2009 | Twitchell, Jr. | | |
| 2009/0181623 A1 | 7/2009 | Twitchell, Jr. | | |
| 2009/0181625 A1 | 7/2009 | Twitchell, Jr. | | |
| 2009/0215407 A1 | 8/2009 | Twitchell, Jr. | | |
| 2009/0237216 A1 | 9/2009 | Twitchell, Jr. | | |
| 2009/0267770 A1 | 10/2009 | Twitchell, Jr. | | |
| 2009/0295564 A1 | 12/2009 | Twitchell, Jr. | | |
| 2010/0007470 A1 | 1/2010 | Twitchell, Jr. | | |
| 2010/0107092 A1* | 4/2010 | Kindberg | .......... | G06F 17/30879 715/760 |
| 2010/0121862 A1 | 5/2010 | Twitchell, Jr. | | |
| 2010/0130267 A1 | 5/2010 | Twitchell, Jr. | | |
| 2010/0141401 A1 | 6/2010 | Twitchell, Jr. | | |
| 2010/0141449 A1 | 6/2010 | Twitchell, Jr. | | |
| 2010/0159986 A1* | 6/2010 | Lewis | .................. | G06K 7/0008 455/557 |
| 2010/0214074 A1 | 8/2010 | Twitchell, Jr. | | |
| 2010/0219938 A1 | 9/2010 | Twitchell, Jr. | | |
| 2010/0219939 A1 | 9/2010 | Twitchell, Jr. | | |
| 2010/0231381 A1 | 9/2010 | Twitchell, Jr. | | |
| 2010/0250460 A1 | 9/2010 | Twitchell, Jr. | | |
| 2010/0260087 A1 | 10/2010 | Twitchell, Jr. | | |
| 2011/0006882 A1 | 1/2011 | Twitchell, Jr. | | |
| 2011/0047015 A1 | 2/2011 | Twitchell, Jr. | | |
| 2011/0080267 A1* | 4/2011 | Clare | ...................... | G01S 13/82 340/10.4 |
| 2012/0147798 A1* | 6/2012 | Miller, II | .................. | G06K 1/18 370/310 |
| 2014/0018128 A1* | 1/2014 | Martin | ................. | G06K 7/0004 455/556.1 |
| 2015/0205990 A1* | 7/2015 | Younger | ............... | H04W 4/008 340/10.1 |

OTHER PUBLICATIONS

Written Opinion (PCT/ISA/237) dated Oct. 28, 2014, by the IB Patent Office as the International Searching Authority for International Application No. PCT/IB2014/061031.

* cited by examiner

US 9,984,262 B2

METHOD OF OPERATING AN RFID-ENABLED MOBILE TELEPHONE, MOBILE TELEPHONE, REMOTE UNIT AND APPLICATION PROGRAM PRODUCT

TECHNICAL FIELD OF THE INVENTION

The present invention relates to a method of operating a mobile telephone with an RFID (Radio Frequency Identification) communication unit (a so-called RFID-enabled mobile telephone), and it further relates to a mobile telephone that is operable according to the method, to a corresponding remote unit, and to an application program product to be executed on the mobile telephone.

BACKGROUND OF THE INVENTION

A mobile telephone with an RFID tag reader and the use of such a telephone for localizing correspondingly tagged objects are well known. For example, WO 2006/092220 A2 describes a method for preventing the loss of keys that are coupled to an RFID tag. The mobile telephone determines and stores location information of the RFID tag and periodically evaluates an RFID signal received from the RFID tag to update the previously stored location information. If the user loses/misplaces his keys, he can review the stored location information and with the knowledge of the most recently known location the user has a good chance to retrieve the lost keys.

SUMMARY OF THE INVENTION

The present invention has the objective to propose an improved method of operating an RFID-enabled mobile telephone, and to further propose an improved mobile telephone, an improved remote unit and an improved application program product.

This objective is met by a method with the features specified in claim 1. A mobile telephone, a remote unit, an application program product and further embodiments of the invention are specified in the further claims.

The present invention concerns a method of operating a mobile telephone for indicating information of at least one portable object. The mobile telephone comprises an RFID communication unit and the method comprises the steps of:
  operating the RFID communication unit for receiving an RFID signal from an RFID tag that is attached to the at least one portable object;
  evaluating the received RFID signal for determining tag information; and
  presenting the tag information to the user of the mobile telephone for indicating current information of the at least one portable object.

This way, up-to-date information of the one or more portable objects is available precisely when needed. For example, the user may obtain a quick overview and reliable confirmation that everything is "on board" at the moment he walks out of the door of his home.

The term "mobile telephone" includes all kinds of portable end-user devices of a wireless wide area telecommunication network. Thus, the mobile telephone provides a wireless telecommunication connection, which in turn provides telecommunication services to the user such as a voice connection and/or data transmission, e.g. e-mail or SMS. The plural form of "services" also includes a single service. The mobile telephone is a personal device that is intended to be used by a single person, i.e. a specific user, and is intended to be carried by the user during his daily activities. In one example, the mobile phone is designed to be operable during at least one or more working days, in particular during at least 12 hours or 8 hours. In another example, the mobile telephone is a cellular telephone, which is part of a cell-structured telecommunication network such as a GSM, UMTS or LTE network. In a further example, the mobile telephone is a personally worn device such as a watch, jewellery or clothing.

In one example, the mobile telephone comprises a sender, a receiver and one or more antennas for providing the telecommunication connection and/or a SIM card for providing the telecommunication services. In another example, the mobile telephone comprises an audio unit with a microphone and an acoustic transducer, e.g. a loudspeaker, for providing audio communication to the user of the mobile telephone. In a further example, the mobile telephone comprises a user input interface such as a button or touch screen and/or a user output interface such as a display (screen) or touch screen.

In another example, the RFID communication unit comprises a receiver and/or a sender and one or more antennas for providing an RFID connection between the mobile telephone and the RFID tag. In another further example, the mobile telephone comprises a power supply such as a rechargeable battery for supplying power to the mobile telephone, in particular to at least one of: the telecommunication unit, the RFID communication unit, the audio unit, the user input interface and the user output interface.

The mobile telephone has a surrounding RFID read range such that the RFID communication unit is able to receive a signal from an RFID tag located in the environment of the mobile telephone, if this RFID tag is within the RFID read range. In an ideal case of undisturbed radiation propagation the RFID read range may be represented by a volume of a sphere, for example a sphere with a radius of ca. 1.5 m.

The term "portable object" as used in the present invention, is an item connected to an RFID tag, also called tagged object or simply object. Such a portable object may be any kind of item typically carried on one's way in addition to the mobile telephone, in particular a valuable and/or important item. For example the portable object is a wallet, a key such as a car key, an office key or an apartment key, but also a passport or a personal card such as an identification card, a driving license, a health card or a credit card, also items for travelling such as a map, a PDA, a personal computer, a memory stick, a briefcase, a document, further a piece of luggage or a personal article such as a medical box, a hygienic bag, a case for glasses (e.g. reading glasses or sunglasses) or a pocket knife.

The term "tag information" is used for all kinds of tag-related information, for example, the presence or the absence of an RFID signal received from the RFID tag, in particular a signal strength, a frequency, a phase relation, a propagation time or round trip time and further the information associated with and/or stored in the RFID tag, in particular its identification (ID), security information or further data such as numbers or coded data.

Surprisingly the method according to the invention is very efficient, reliable and convenient, because the user can easily and instantly check and/or confirm the presence of his portable objects, for example, at the moment when he starts walking away from a place, e.g. his office or his home. Such a check and/or confirm can be performed without losing time, even when the user is in a hurry. Thus, under the concept of the present invention, a leaving behind of the portable objects is avoided right at the beginning of the journey.

Further, the user obtains an up-to-date confirmation of his portable objects, which gives confidence and a good feeling of security and avoids unpleasant or embarrassing searches. This is particularly advantageous for handicapped and/or elderly persons.

Even in the case that the tag information indicates that one or more portable objects have been left behind, which corresponds to the situation that the RFID tag has left the RFID read range, it often may be possible to walk back a few meters and fetch the left-behind objects.

Further, the method according to the invention is energy efficient, because there is no need to store the tag information in a memory and to perform writing and reading. This advantage is particularly important for mobile telephones, which are designed to meet extremely severe energy requirements, such as providing all kinds of telecommunication and/or personal information services during a working day, wherein the batteries are required to be light in weight, small in size, long lasting and free of maintenance.

In an embodiment of the invention, the method comprises the step of receiving a user control command and thereupon activating the RFID communication unit for performing the step of operating the RFID communication unit, in particular receiving the user control command via a user input interface of the mobile telephone and/or of a remote unit. This way the tag information is obtained instantly on demand.

The remote unit may be any kind of device that is wirelessly connected to the mobile telephone, for example as described further below, e.g. a watch or a bracelet.

Further, the user may reconfirm the presence of a portable object by reissuing the user control command and hence demand refreshing the tag information at anytime. For example after having walked away a few meters, typically within one or two seconds, the user may call for an updated confirmation that the portable object is still within the RFID read range and hence nearby.

In addition, the user control command provides for very energy efficient operation, because the RFID communication unit is only activated on user request, i.e. when the tag information is actually needed. This avoids energy consumption for determining unused tag information.

In a further embodiment of the method according to the previous embodiment, the receiving of the user control command comprises detecting a user initiated event, in particular an occurrence of at least one of:
  a manipulation, in particular an actuation of a button,
  an acoustic signal, in particular a spoken command, and
  an acceleration, in particular a movement pattern.

The actuation of a button includes all kinds of activities, including recognizing a gesture or touching a touch screen. In one example, the user control command is a spoken word or a sequence of words, for example "ready to go?" or "all on board?". Such a spoken command is particularly convenient, because no free hands are needed to search and operate the mobile telephone, which for example may be hidden somewhere in a jacket or a bag.

The acceleration may be detected by a build-in accelerometer, which in particular may be implemented by using MEMS (Microelectromechanical systems). The acceleration may related to a start of the user to walk away or to the putting on a coat, and further to a specific movement of the mobile telephone or the remote unit such as a shaking or a specific back-forward-back twist of the wrist. A movement pattern is particularly convenient, because it can be performed easily when walking away and may be unnoticed by other persons. Further, by combining different user related events a verification of the user control command can be achieved, which helps to avoid false interpretations.

In a further embodiment of the method according to the invention, the step of operating the RFID communication unit comprises using a user-controlled amount of energy and/or an amount of energy allocated in dependency of the received RFID signal, further in particular by emitting an RFID signal with a controlled strength and/or during a controlled period of time. This way, energy consumption dynamically takes into account the actual situation.

The user may budget the use of energy for the RFID communication dependent on the specific situation and on his need for the tag information. For example, the user may decide to use all of the energy of the battery of the mobile telephone for an urgently needed confirmation that his passport is somewhere in his briefcase, if he can recharge the battery later in his car. In one example, the user can choose the energy to be consumed via a user input interface of the mobile telephone or the remote unit, for example by selecting the parameters from a menu presented on a display or by turning a knob or button on a watch.

In one example, the allocated amount of energy is increased if the intensity of the received RFID signal is weak in order to resolve ambiguities and to obtain reliable tag information. The amount of energy may be decreased if all the searched RFID tags are near the mobile telephone.

Further, the control of energy consumption allows allocating a large amount of energy for detecting the RFID tag, in particular for energizing the RFID tag and/or receiving the RFID signal. Thus, by emitting a high power RFID signal and/or using a powerful reception algorithm, a reliable detection of the RFID tag and/or an extensive RFID read range are made possible, even if the RFID tag is badly positioned, e.g. covered by other objects or hidden behind radiation obstacles.

In an embodiment of the invention, the method comprises the step of storing the received RFID signal and substantially deactivating the RFID communication unit after the receiving of the RFID signal, in particular before the step of evaluating the received RFID signal. This keeps the operation time of the RFID communication unit at a minimum.

In a further embodiment of the method according to the invention, the step of operating the RFID communication unit comprises at least temporarily disabling telecommunication, in particular by reallocating a power supply of the mobile telephone and/or by reconfiguring a telecommunication unit of the mobile telephone to operate as the RFID communication unit. This way the hardware of the mobile telephone is reused and/or the available energy is focused on a specific task. This provides a cost efficient and reliable operation.

In combination with a user control, the user will generally accept an interruption of the telecommunication connection, if he can control the moment of interruption himself. Further, if such an interruption is of short duration, e.g. less than 100 ms or less than 10 ms, the interruption will hardly or not be noticed and if the telecommunication connection is a packet switched connection, e.g. a data connection, the interruption may be compensated by retransmissions.

In a further embodiment of the method according to the invention, the at least one RFID tag is a passive RFID tag and the step of operating the RFID communication unit comprises emitting a signal for energizing the at least one RFID tag. Since the passive RFID has no internal power supply this tag needs to be energized by an external power source, i.e. by the radiation energy received via its antenna in order to start operating. The passive tag is very convenient and reliable, because there is no need to use batteries, which may degrade and/or may require replacement. This is particularly useful for seldom used objects, e.g. a passport.

In one example, the emitting of the signal for energizing the at least one RFID tag comprises emitting at least one signal burst, in particular a predetermined number of signal bursts. In another example, the emitting of the signal for energizing the at least one RFID tag comprises emitting the RFID activation signals at different frequencies, in particular scanning of a range of frequencies. In a further example, after having been activated the passive RFID tag sends back an RFID signal, a so-called backscattered signal, which is modulated by the RFID tag, in particular by switching the impedance of the RFID tag between low and high states.

In a further embodiment of the method according to the invention, the step of evaluating the received RFID signal comprises identifying the RFID tag and/or determining location information, in particular determining at least one of:
 a presence or an absence of the RFID tag in the RFID read range of the mobile telephone,
 a proximity of the RFID tag to the mobile telephone,
 a distance between the RFID tag and the mobile telephone,
 a movement of the RFID tag relative to the mobile telephone,
 a position of the RFID tag relative to the mobile telephone, and
 an absolute position of the RFID tag.

This way, reliable and particularly informative object identification and/or object localization is achieved.

The RFID tag may be identified by its ID (e.g. a unique identification number), a specific code, the frequency or a phase relation of the received RFID signal. The proximity, e.g. a rough distance estimation, or the distance, e.g. a measurement, may be determined from the signal intensity of the received RFID signal and/or its go-and-return time, i.e. the round-trip-time or the propagation time of the RFID signal, and may be presented by displaying a bar diagram. The movement may be determined from the variation of the phase relation of the received RFID signal and may be presented by displaying a symbol with increasing or decreasing size. The relative position may be determined using the principle of beamforming, for example by phase controlling multiple antennas, and may be presented by displaying an arrow or a pointer. The absolute location may be determined from the relative position and by using a GPS module of the mobile telephone and may be presented by displaying a pin on a map.

In an example, the presenting of the tag related information comprises displaying a visual information, in particular a symbol or an icon, and/or emitting an acoustic signal, in particular a tune such as "di-du-dli" or one or more words, for example "yes, ready" or "unsure about key". An acoustic signal is particularly convenient, because there is no need to get hold of the mobile telephone for observing the display. Thus, for presenting the tag information the mobile telephone may be left in a jacket or bag.

In one example, the operation of the RFID communication unit comprises emitting an RFID tag specific call signal, i.e. enquiry signal and the step of receiving an RFID signal comprises receiving a corresponding response from the RFID tag. This avoids interference between multiple RFID tags. The RFID tag specific call signal may be generated according to at least one of: a code sequence, a modulation, a frequency and a polarization.

In one example, if the RFID communication unit emits a signal with a specific frequency. Only the RFID tag, which is adapted to this specific frequency is in resonance, gets activated and responds, whereas RFID tags adapted to different frequencies remain deactivated. In another example, the RFID tag responds with a signal at a frequency that is different from the frequency of the call signal, i.e. with a shifted frequency, and the RFID tag is identified by the frequency shift. In these examples, the RFID communication unit operates as a resonance detector, which detects the presence of the RFID tags by scanning a number of different frequencies or a range of frequencies and by detecting the resonances of the RFID tags. For example, the RFID tag is based on the principle of surface acoustic wave (SAW).

In a further embodiment of the invention, the tag information is presented via a user output interface of the mobile telephone and/or at least partly via a user output interface of a remote unit, which is connected to the mobile telephone via a local wireless connection. In particular the remote unit further presents information of the local wireless connection. This way a particular convenient presentation of the tag information or a part thereof is achieved. In one example the mobile telephone and/or the remote unit emits an alarm, if the intensity of the received signal of the local wireless connection drops below a predetermined threshold. Further, for saving energy, the display of the mobile telephone may remain switched off, if the information presented by the remote unit is sufficient to the user.

In a further embodiment of the invention, the method comprises automatically repeating at least one of the steps of the method, in particular the step of operating the RFID communication unit, after a user definable and/or a predetermined period of time, in particular after a period of 1 to 10 s, further in particular after a period of 2 to 4 s. This way a particular reliable and fast determination of a left behind object is achieved. For example, from the actual situation and from experience the user may estimate the necessary or optimum time interval for a refresh and hence he may define the period of time accordingly, for example by setting a timer.

In a further embodiment of the method according to the invention, the step of evaluating the received RFID signal comprises activating an alarm unit, if the tag information substantially deviates from a previously determined tag information, in particular if the intensity of the received RFID signal drops below a predetermined level, further in particular below 50% of a previously determined level. This way the user's attention is instantly drawn to an object that has been dropped or left behind.

Further, the invention concerns a mobile telephone for indicating information of at least one portable object. The mobile telephone comprises an RFID communication unit for receiving an RFID signal transmitted from an RFID tag that is attached to the at least one portable object and an evaluation unit for evaluating the received RFID signal to determine tag information. The mobile telephone is configured to present the tag information via a user output interface for indicating current information of the at least one portable object.

The user output interface may also be used as user input interface, for example on a mobile telephone with a touch screen.

In a further embodiment of the mobile telephone according to the invention, the RFID communication is configured to provide an RFID read range between 0.2 m and 3 m, in particular between 0.3 m and 2 m, and/or a maximum transmission power of 1 Watt ERP, in particular 0.5 Watt ERP. This avoids receiving an RFID signal from distances, which are not relevant. If the RFID range is less than specified above, only portable objects that are located near the mobile telephone will be detected and there is evidently no point the user searches for them. If the RFID range is more than specified above the user or the evaluation unit may erroneously concluded that a remotely located RFID tag is nearby. Thus, the configuration as specified above achieves an improved reliability combined with energy savings.

In a further embodiment of the mobile telephone according to the invention, the mobile telephone comprises a telecommunication unit for providing telecommunication services, a power supply and a switching unit for allocating the electrical power supplied by the power supply between the telecommunication unit and the RFID communication unit. The switching unit may be implemented by any type of switching circuit, for example an electrical switch or a semiconductor.

In a further embodiment of the mobile telephone according to the invention, the RFID communication unit and/or an antenna thereof is multifunctional, in particular configurable to provide a telecommunication connection and/or a local communication connection for connecting the mobile telephone to a remote unit. This way, a very cost effective RFID-enabled mobile telephone can be achieved.

In one example the sender and/or the receiver of the RFID communication unit is adapted to match with the requirements for the telecommunication connection and/or the local communication connection, in particular to match the frequency, the type of modulation or the communication protocol. In another example, the RFID tag is adapted to match with the telecommunication connection and/or the local communication connection, i.e. the frequency.

In a further example, the RFID communication unit is configured for UHF operation (Ultra-high frequency, i.e. 0.3 and 3 GHz), in particular to operate at a frequency between 0.8 and 1 GHz. In another example, the RFID communication unit is configured to operate according to the ISO 18000-6B or the EPC Global Gen2 standard (860-960 MHz or 902-928 MHz). In another further example, the RFID communication unit is configured to operate at frequencies used for wireless WAN telecommunication (GSM, UMTS, LTE) and/or wireless local communication LAN (WLAN, Bluetooth), in particular at frequencies of more than 2 GHz. In a further example, the local communication connection is a Bluetooth, WLAN or a ZigBee connection.

The invention further concerns a remote unit, in particular to a watch or a bracelet, wherein the remote unit is connectable via a local wireless connection to the mobile telephone according to any one of the previous embodiments. The remote unit is configured to receive tag information from the mobile telephone and to present the received information via a user output interface of the remote unit and, in particular, to further indicate information of the local wireless connection.

The remote unit can be any kind of personal device with signal processing functionality, for example a head-worn device such as a remote headset or glasses or a wrist-worn device such as a watch or a bracelet, jewelry or clothing.

The invention further concerns an application program product, which is executable on a mobile telephone and/or a remote unit for performing the method according to the invention. The presentation of the tag information and/or an identification of the at least one portable object is selectable and/or configurable by the user of the mobile telephone. This way an informative design and/or efficient selection of the tag information are achieved. In one example, the application program product is a so called "App", which is conveniently downloadable and easy to install.

In a further embodiment of the invention, the application program product comprises a set of multiple user selectable scenarios, in particular scenarios comprising a user configurable and/or user designable visualization. This way an optimized presentation of the actual and/or relevant tag information is achieved. Thus, the presentation is adapted to the individual needs and preferences of the user.

In one example, the user selectable scenarios comprise at least two of: leaving home, leaving office, changing offices, travelling, sports and hiking.

The effects and advantages of the above mentioned method also apply to the mobile telephone, the remote unit and the application program product and vice versa. Further, it is expressly pointed out that any combination of the above-mentioned embodiments, or combinations of combinations, is subject to a further combination. Only those combinations are excluded that would result in a contradiction.

BRIEF DESCRIPTION OF THE DRAWINGS

Below, the present invention is described in more detail by means of exemplary embodiments and the attached drawings, wherein.

BRIEF DESCRIPTION OF THE INVENTION

The embodiments described herein are meant as illustrating examples and shall not confine the invention.

Figure 1:
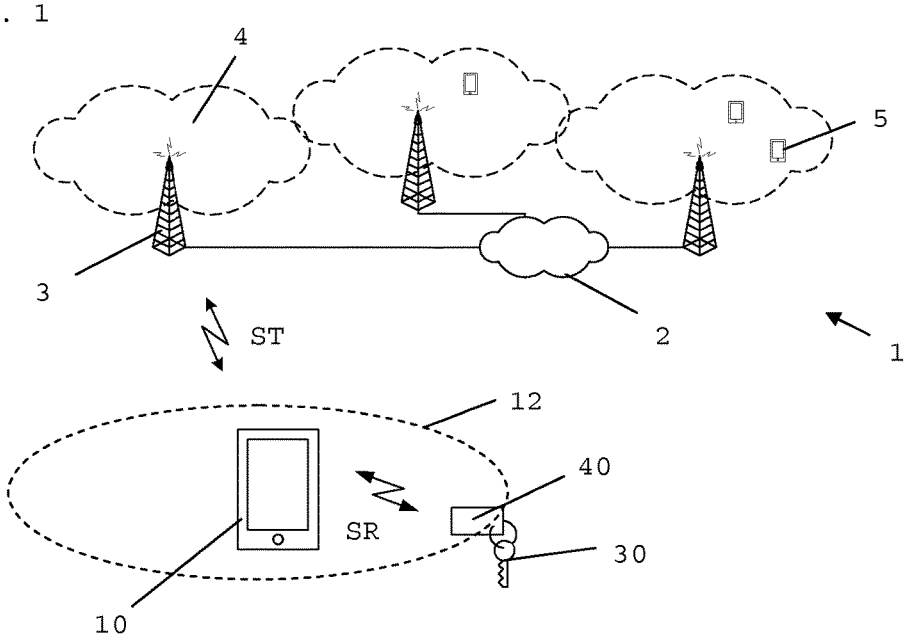
FIG. 1 shows a simplified illustration of a cellular telecommunication system, a mobile telephone according to the invention and a key with an attached RFID Tag.

FIG. 1 shows a simplified illustration of a cellular telecommunication network 1, a mobile telephone 10 according to the invention and a key 30 with an attached RFID tag 40. The key 30 is a portable object in the sense of the invention, i.e. a personal item with an attached RFID tag 40.

The mobile telephone is operated to determine information related to the RFID tag 40 respectively the key 30 and to present this information to the user of the mobile telephone 10, for example the presence or absence of the key 30 in the near environment of the mobile telephone 10.

The cellular telecommunication network 1 is schematically indicated by three base stations 3, which are connected to a wide area network 2, schematically indicated by a cloud symbol. Each of the base stations 3 comprises a radiation cell 4 surrounding the base station 3, schematically indicated by a dashed cloud symbol. The radiation cells 4 define a cellular structure, namely a substantially two-dimensional field of radiation cells. A number of mobile telephones 5 (schematically indicated by small mobile telephones in the radiation cells), are wirelessly connected to its assigned base station 3. The mobile telephones 5 may communicate to each other via the base stations 3 and, as the case may be, via the wide area network 2. Connections to a fixed-wire network and to the internet are also possible (not shown). For example, the cellular telecommunication network 1 is a GSM telecommunication network and the diameter of the radiation cell 4 is typically between 1 km and 20 km.

The mobile telephone 10 is also connected to the cellular telecommunication network 1 via a wireless connection, i.e. the mobile telephone 10 is also within the radiation cell 4 of at least one of the base stations 3. Thus, the mobile telephone 10 may exchange bidirectional telecommunication signals ST with the base stations 3 (indicated by a double arrow).

The mobile telephone 10 is RFID-enabled and comprises an RFID read range 12, which surrounds the mobile telephone 10 like a spherical volume (schematically indicated by the dotted line). The mobile telephone 10 is capable of communicating with the RFID Tag 40 via a wireless RFID signal SR, because the RFID tag 40 is located within an RFID read range 12 of the mobile telephone 10. In this example the RFID read range 12 is approximately 1.5 meter (drawing is not to scale), such that all tags in the near environment of the user can reliably be detected.

Figure 2:
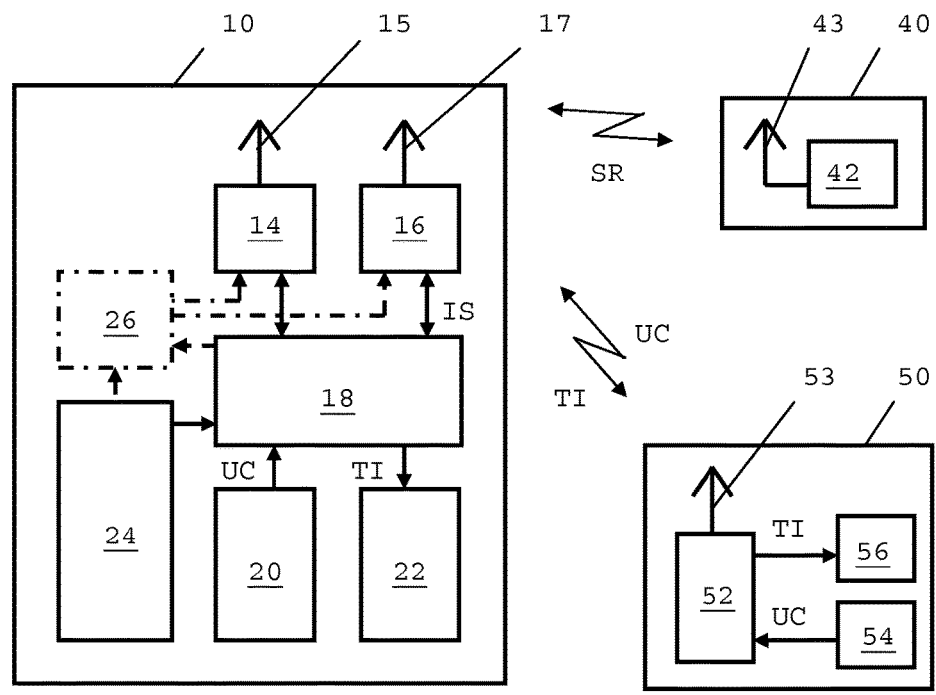
FIG. 2 a simplified block diagram illustrating an embodiment of the mobile telephone according to FIG. 1, the RFID Tag and a remote unit.

FIG. 2 shows a simplified block diagram illustrating an embodiment of the mobile telephone according to FIG. 1, the RFID Tag 40 and a remote unit 50.

The mobile telephone 10, also called a smart phone, is a personal device for all kinds of daily activities such as making phone calls, exchanging messages and e-mails, or accessing personal information, for example consulting a calendar or taking notes. The mobile telephone 10 comprises a telecommunication unit 14, which comprises a sender, a receiver and a telecommunication antenna 15, and an RFID communication unit 16, which similarly comprises a sender, a receiver and an RFID antenna 17. The RFID antenna 17 may be implemented by a dipole or a spiral antenna. Further, the mobile telephone 10 comprises a signal processing unit 18 as an evaluation unit, a button 20 as a user input interface, a display 22 as a user output interface and a power supply 24.

The RFID tag 40 comprises a processing unit 42, i.e. an RFID chip, e.g. a NXP-Chip, with a tag antenna 43. In this example, the RFID tag 40 is a passive UHF tag, which is operated according to the ISO/IEC 18000-6C standard at a frequency of 868 MHz. The RFID communication unit 16 of the mobile telephone 10 is configured to match with the RFID tag 40, i.e. uses the same protocol and frequency.

The telecommunication unit 14 and the RFID communication unit 16 are connected to the signal processing unit 18, for bidirectionally exchanging signals, for example signals for carrying control data, RFID data or audio data. Further, the button 20 is electrically connected to the signal processing unit 18 for transmitting a control signal UC from the button 20 the signal processing unit 18. Also, the display 22 is electrically connected to the signal processing unit 18 for transmitting tag information TI from the signal processing unit 18 to the display 22. Further, the power supply 24 is connected to the signal processing unit 18 and to all the other units of the mobile telephone 10 for supplying electrical energy. The signal processing unit 18 may be implemented by a microprocessor, in particular a digital and/or programmable processor.

In this example, the mobile telephone 10 is either operated in telecommunication mode or in RFID detection mode. In the telecommunication mode, the signal processing unit 18 activates the telecommunication unit 14 for providing telecommunication services such as a voice connection and/or a data connection and deactivates the RFID communication unit 16. Conversely, in RFID detection mode, the RFID communication unit 16 is activated for providing the RFID communication with the RFID tag 40 and the telecommunication unit 14 is deactivated.

In operation, the communication unit 16 bidirectionally communicates with the processing unit 42 of the RFID tag 40 via the RFID signal SR, which is wirelessly transmitted between the transponder antenna 17 and a tag antenna 43 and vice versa. If the user queries for tag information TI, for example if he wishes to confirm that his keys are nearby somewhere in his coat, he may initiate a search for the tag 40 by pushing the button 20. Accordingly, the button 20 sends a control command UC to the signal processing unit 18, which—upon receiving the control command UC—switches the mobile telephone 10 from the telecommunication mode to the RFID detection mode. The RFID communication unit 16 emits an RFID call signal for energizing the RFID tag 40, in this example at a transmission power of 0.5 Watt ERP, which gives the RFID read range of approx. 1.5 m. Having been energized, the RFID tag 40 transmits the RFID signal SR as a response to the RFID call signal. After having received the RFID signal SR from the RFID tag 40 the RFID communication unit 16 provides an intermediate signal IS, which corresponds to the RFID signal SR, and sends this intermediate signal IS to the signal processing unit 18. In the following, the signal processing unit 18 switches the mobile telephone 10 back from the RFID detection mode to the telecommunication mode.

In the next step, the signal processing unit 18 evaluates the intermediate signal IS for determining the tag information TI. This is accomplished in parallel during the operation in telecommunication mode. The result of this evaluation, i.e. the tag information TI, is then displayed on the display 22.

In one embodiment of the invention, the mobile telephone 10 further comprises a switching unit 26 (indicated by the dashed-dotted lines). The switching unit 26 is on one hand connected to the power supply 24 for receiving electrical energy and to the signal processing unit 18 for receiving a control signal. On the other hand the switching unit 26 is connected to telecommunication unit 14 and to the RFID communication unit 16 for selectively forwarding—under control of the signal processing unit 18—the electrical energy provided by the power supply 24. In telecommunication mode the switching unit 26 allocates the electrical energy of the power supply 24 to the telecommunication unit 14 and in RFID detection mode to the RFID communication unit 16. Thus, power is supplied according to the activation of the respective communication unit.

Figure 3:
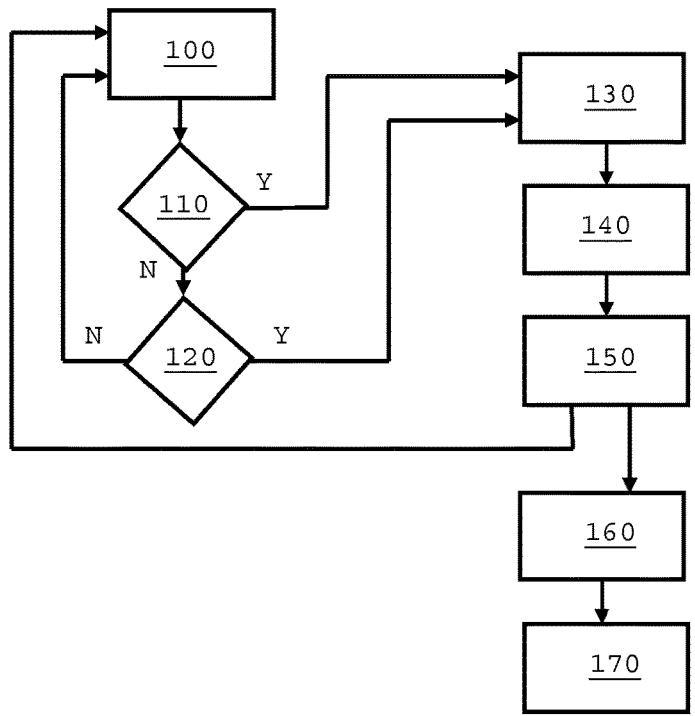
FIG. 3 a simplified flow diagram illustrating the method according to the invention for operating the mobile telephone of FIG. 2.
Figure 4:
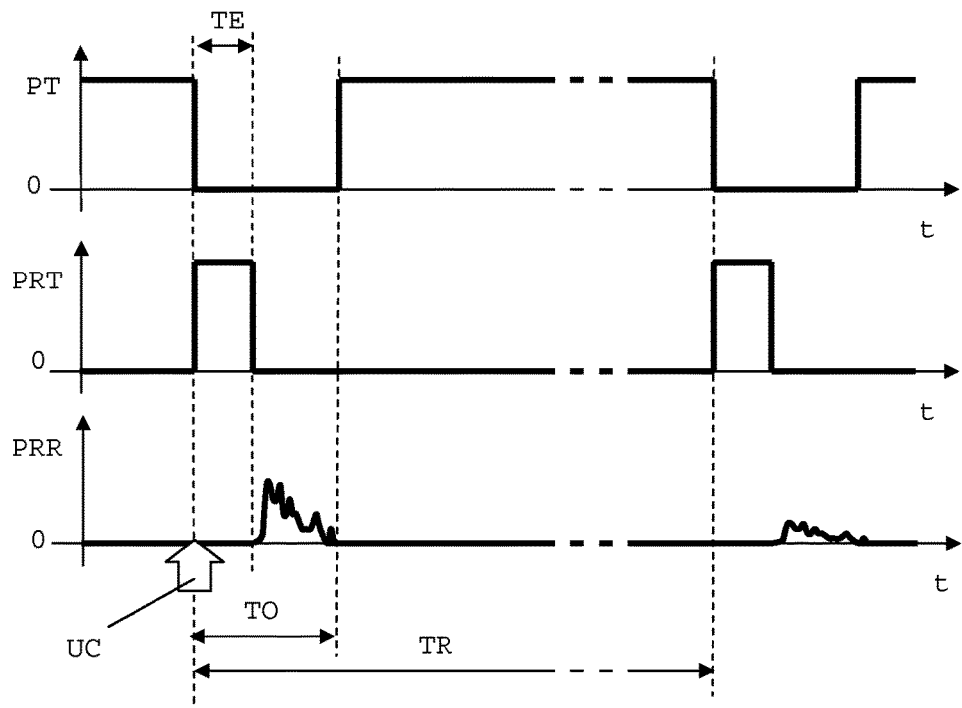
FIG. 4 a simplified diagram illustrating the time curve of signals PT, PRT and PRR during operation of the mobile telephone according to FIG. 2.
Figure 5:
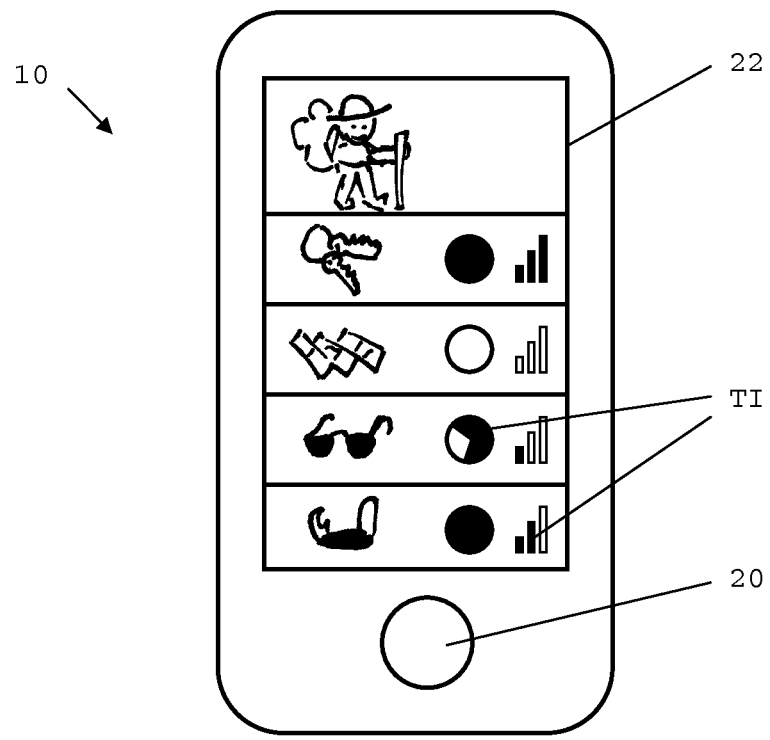
FIG. 5 a simplified illustration showing the presentation of tag information TI on a display of the mobile telephone according to FIG. 2.

Further details of operating the mobile telephone 10 and of the presenting the tag information TI are shown in FIG. 3, FIG. 4 and FIG. 5.

FIG. 3 shows a simplified block diagram illustrating the method according to the invention for operating the mobile telephone 10 of FIG. 2.

In this example, the method performs a number of steps, depicted as blocks 100, 110, 120, 130, 140, 150, 160 and

170. The steps are explained by the following instructions, wherein the reference signs refer to FIG. 1 and FIG. 2:

Block 100: Operate the telecommunication unit 14 for providing telecommunication services, wherein the RFID communication unit 16 is substantially deactivated.

Block 110: Query, whether a user control command UC has been received via the user interface 20 of the mobile telephone 10; if yes (Y) initiate a repetition timer and go to block 130, if not (N) go to block 120.

Block 120: Query, whether the repetition timer has expired; if yes (Y) go to block 130, if not (N) return to block 100.

Block 130: Activate the RFID communication unit 16 and emit a signal for energizing the RFID tag 40.

Block 140: Receive a RFID signal SR from the RFID tag 40.

Block 150: Deactivate the RFID communication unit 16, continue to block 160 and also return to block 100.

Block 160: Evaluate the received RFID signal SR for determining the signal strength of the received RFID signal SR and determine tag information TI by deciding, whether the RFID tag 40 is within the RFID read range 12 or not.

Block 170: Present the tag information TI on the display 22 of the mobile telephone 10.

Thus, according to the above method, the user receives up-to-date tag information TI at the moment when he pushes the button 20, for example, at the moment he walks out of the door of his home, his office, a sports hall or a hotel. This information is automatically updated after the expiration of the repetition timer, which in this example is set by the user to approximately 2 seconds. Typically, the user requests the tag information TI several times per day, for example between 1 and 10 times per day.

FIG. 4 shows a simplified diagram illustrating the time curve of signal intensities PT, PRT and PRR during the operation of the mobile telephone 10 according to FIG. 2. The telecommunication intensity PT represents the combined transmission and receiving intensity of the telecommunication unit, the transmission intensity PRT represents the power of signal emitted by the RFID communication unit and the receiving intensity PRP represents the power of the signal received by the RFID communication unit. The diagram depicts the time t on the x-axis and each signal intensity PT, PRT and PRR on a respective y-axis. Events of substantially equal time t are shown by dashed lines.

Upon receiving the user control command UC, the telecommunication unit is deactivated and the telecommunication intensity PT drops to zero, whereas the RFID communication is activated such that the transmission intensity PRT rises to a high level during a time TE in order to emit a signal, e.g. a signal burst, for energizing the RFID tag. After the time TE, the RFID communication unit turns from transmitting operation to listening operation such that the transmission intensity PRT drops to zero and the receiving intensity PRP appears as a weaker signal with fluctuating and decreasing intensity. Towards the end of the decrease of the receiving intensity PRP, after the time TO, the RFID communication unit is terminated and deactivated, whereas the telecommunication unit is activated and the telecommunication intensity PT returns back to the previous high level.

After a repeating time TR, for example after 2 seconds (not drawn to scale, as indicated by the dashed lines), the above steps are repeated. The intensity level of the receiving intensity PRP during the repeated RFID communication is much lower than during the first RFID communication, in particular less than 50%. This may indicate that the RFID tag has moved away during the time TR, or equivalently, that the RFID tag and the associated object may have been left behind. Thus, an alarm is emitted for alerting the user of this situation.

FIG. 5 shows the presentation of tag information TI on a display 22 of the mobile telephone 10 according to FIG. 2. The mobile telephone 10 comprises the button 20 and the display 22 for presenting the tag information TI.

For obtaining such a presentation, the application program product according to the invention is loaded onto the mobile telephone 10 and executed there as an application program. The application program, a so-called "app", comprises a set of multiple scenarios, from which the user may select a specific scenario. These scenarios and/or their components may be configured and/or arranged by the user. In one example, the application program product, different scenarios and/or components thereof may be downloaded from an internet server and installed by the user and/or may be designed by the user himself, in particular by using a graphics app.

In this example, the user has selected the scenario "hiking", as indicated in the header of the display 22. This scenario comprises a list of 4 pictograms representing 4 portable objects, which the user has configured in advance according his personal preferences and needs, in this case: a bunch of keys, a hiking map, sunglasses and a pocket knife.

After the user has pushed the button 20, the application program performs the method according to the invention and presents the tag information TI on the display 22. The tag information TI shows for each of the objects, whether the respective object is considered present in the RFID read range of the mobile telephone (indicated by differently filled circles). In this case the bunch of keys and the pocket knife are considered present; the hiking map is missing and the presence of the sunglasses is uncertain. In addition, the display 24 also indicates the received signal strength (indicated by filled bars of increasing size). Thus, the user is also informed about doubtful cases, in this case the sunglasses.

The method according to the invention may also be useful to determine objects, which should not be carried away, for example an archive key from an office or a room key from a hotel. Of course, this only works if the object in question has previously been equipped with an RFID tag.

Figure 6:
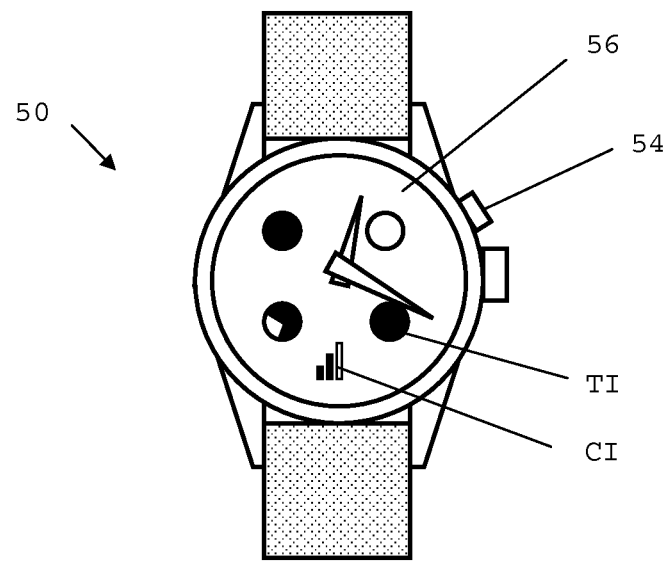
FIG. 6 a simplified illustration showing the presentation of tag information TI on a wrist-watch, which is a remote unit according to the invention.

FIG. 6 shows a simplified illustration showing the presentation of tag information TI on a wrist-watch 50, which is a remote unit according to the invention and which is the remote unit 50 according to FIG. 2. The wrist-watch 50 is wirelessly connected to the mobile telephone 10 according to FIG. 5 via a Bluetooth connection (not shown).

The wrist-watch 50 comprises a button 54 as user input interface and a clock face 56 as user output interface. The clock face 56 is configured to present tag information TI, which corresponds to a part of the tag information displayed on the display 22 of the mobile telephone 10 according to FIG. 5.

By pushing the button 54 or by shaking his wrist according to a specific movement pattern, the user sends a user control command from the wrist-watch 50 to the mobile telephone 10 via the Bluetooth connection. The mobile telephone 10 initiates the operation of the RFID communication unit as described previously. In response, the mobile telephone sends the part of the tag information TI via the Bluetooth connection to the wrist-watch 50, where the received information TI is displayed on the clock face 56.

In addition, the clock face 56 also indicates information CI of the intensity of the signal received via the Bluetooth connection. In this example, the information CI is displayed by two filled bars, which indicate to the user that the Bluetooth connection is sufficiently stable and that the mobile telephone is somewhere nearby.

The invention claimed is:

1. A method of operating a mobile telephone for indicating information of at least one portable object, the mobile telephone having an RFID communication unit, the RFD communication unit including a first antenna, and the method comprising:
   operating the RFID communication unit for receiving an RFID signal from an RFID tag that is attached to at least one portable object;
   evaluating the received RFID signal for determining tag information;
   presenting the tag information to a user of the mobile telephone for indicating current information of the at least one portable object; and
   receiving a user control command and thereupon activating the RFID communication unit for operating the RFID communication unit, the user control command being received via a user input interface of the mobile telephone and/or of a remote unit, the remote unit including a second antenna and a signal processor connected to the second antenna,
   wherein the RFID communication unit is configured to provide an RFID read range between 0.2 m and 3 m and/or a maximum transmission power of 0.5 or 1 Watt ERP.

2. The method according to claim 1, wherein the receiving of the user control command comprises:
   detecting a user initiated event as an occurrence of at least one of:
   a manipulation, via an actuation of a button,
   an acoustic signal, via a spoken command, and
   an acceleration, via a movement pattern.

3. The method according to claim 1, wherein operating the RAD communication unit comprises:
   using a user-controlled amount of energy and/or an amount of energy allocated in dependency of the received RFID signal, by emitting an RFID signal with a controlled strength and/or during a controlled period of time.

4. The method according to claim 1, wherein operating of the RFD communication unit comprises:
   at least temporarily disabling telecommunication by reallocating a power supply of the mobile telephone and/or by reconfiguring a telecommunication unit of the mobile telephone to operate as the RFID communication unit.

5. The method according to claim 1, wherein evaluating the received RFID signal comprises:
   identifying the RFID tag and/or determining location information, by determining at least one of:
   a presence or an absence of the REID tag in an REID read range of the mobile telephone,
   a proximity of the RFID tag to the mobile telephone,
   a distance between the RFID tag and the mobile telephone,
   a movement of the RFID tag relative to the mobile telephone,
   a position of the RFID tag relative to the mobile telephone, and
   an absolute position of the RFID tag.

6. The method according to claim 1, comprising:
   presenting the tag information via a user output interface of the mobile telephone and/or at least partly via a user output interface of the remote unit, which is connected to the mobile telephone via a local wireless connection, wherein the remote unit presents information of the local wireless connection.

7. The method according to claim 1, comprising:
   automatically repeating at least an operating of the RFID communication unit, after a user definable and/or a predetermined period of time of 1 to 10 s.

8. The method according to claim 1, wherein evaluating the received RFID signal comprises:
   activating an alarm unit, if the tag information substantially deviates from a previously determined tag information where the intensity of the received RFID signal drops below a predetermined level.

9. A non-transitory computer-readable storage medium storing thereon a computer program executable on a mobile telephone, the computer program causing a processor provided in the mobile telephone to perform the method according to claim 1, wherein the presentation of the tag information is selectable and/or configurable by a user of the mobile telephone.

10. The non-transitory computer-readable storage medium according to claim 9, comprising:
    a set of multiple user selectable scenarios, which include a user configurable and/or user designable visualization.

11. The method according to claim 1, wherein the RFID tag is a passive RFID tag and the RFID signal is a back-scattered signal.

12. The method according to claim 1, wherein the RFID communication unit is configured to operate at frequencies used for wireless local communication LAN.

13. The method according to claim 1, wherein the RFID communication unit is configured to operate at frequencies used for WLAN or Bluetooth.

14. The method according to claim 1, comprising:
    automatically repeating at least an operating of the RFID communication unit, after a user definable and/or a predetermined period of time of 2 to 4 s.

15. A mobile telephone for indicating information of at least one portable object, the mobile telephone comprising:
    an RFID communication unit for receiving an RFID signal transmitted from an RFID tag that is attached to at least one portable object, the RFID communication unit including a first antenna; and
    a first signal processor configured to evaluate the received RFID signal to determine tag information, the first signal processor being electrically connected to the RFID communication unit and to a user output interface,
    wherein the mobile telephone is configured to present the tag information via the user output interface for indicating current information of the at least one portable object,
    and wherein the RFID communication unit is configured to provide an RFID read range between 0.2 m and 3 m and/or a maximum transmission power of 0.5 or 1 Watt ERP.

16. The mobile telephone according to claim 15, wherein the RFID communication unit and/or the first antenna thereof is/are multifunctional, and configurable to provide a telecommunication connection and/or a local communication connection for connecting the mobile telephone to a remote unit, the remote unit including a second antenna and a second signal processor connected to the second antenna.

17. A remote unit including a second antenna and a second signal processor connected to the second antenna, wherein the remote unit is configured to be connectable via a local wireless connection to the mobile telephone according to claim 15, wherein the remote unit is configured to receive tag information from the mobile telephone and to present the received information via a user output interface of the remote unit and, to indicate information of the local wireless connection, and wherein the mobile telephone and/or the remote unit is/are configured to receive a user control command via a user input interface of the mobile telephone and/or of the remote unit and the mobile telephone is configured to thereupon activate the RFID communication unit for operating the RFID communication unit.

* * * * *